US010550729B2

(12) United States Patent
Drezek et al.

(10) Patent No.: US 10,550,729 B2
(45) Date of Patent: Feb. 4, 2020

(54) ASYMMETRIC GAS TURBINE EXHAUST DIFFUSER

(71) Applicant: General Electric Company, Schenectady, NY (US)

(72) Inventors: Przemyslaw Sebastian Drezek, Warsaw (PL); Marcin Rafal Abramowicz, Piaseczno (PL); Fernando Lopez Parra, Warsaw (PL); Balakrishnan Ponnuraj, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 15/438,996

(22) Filed: Feb. 22, 2017

(65) Prior Publication Data

US 2018/0216495 A1    Aug. 2, 2018

(30) Foreign Application Priority Data

Jan. 30, 2017   (EP) .................................... 17461507

(51) Int. Cl.
    *F01D 25/30*      (2006.01)
    *F02C 3/04*      (2006.01)

(52) U.S. Cl.
    CPC .............. *F01D 25/30* (2013.01); *F02C 3/04* (2013.01); *F05D 2220/32* (2013.01);
    (Continued)

(58) Field of Classification Search
    CPC ........ F01D 25/24; F01D 25/243; F01D 25/26; F01D 25/30; F02K 1/78; F02K 1/82
    See application file for complete search history.

(56) References Cited

U.S. PATENT DOCUMENTS

| 5,188,510 A | * | 2/1993 | Norris | .................... | F01D 25/30 |
| | | | | | 415/208.1 |
| 5,518,366 A | * | 5/1996 | Gray | ...................... | F01D 25/30 |
| | | | | | 415/211.2 |

(Continued)

FOREIGN PATENT DOCUMENTS

WO      80/00989 A1    5/1980

OTHER PUBLICATIONS

Extended European Search Report and Opinion issued in connection with corresponding EP Application No. 17461507.0 dated Nov. 8, 2017.

*Primary Examiner* — Carlos A Rivera
(74) *Attorney, Agent, or Firm* — Fletcher Yoder, P.C.

(57) ABSTRACT

A gas turbine exhaust diffuser is configured to be at least partially disposed within an exhaust collector. The diffuser also includes an inner wall configured to extend to a back wall of the exhaust collector, an outer wall circumferentially disposed about the inner wall along a portion of the collector, and an inlet between the upstream end of the inner and outer walls. The inlet is configured to receive an exhaust flow from a gas turbine engine. An outlet for the exhaust is located between the inner wall and a downstream end of the outer wall. The outer wall is asymmetrically shaped so that an opening between the outlet and the back wall of the exhaust collector is larger on a first lateral side of the diffuser adjacent an exhaust exit of the collector than an opposite lateral side of the diffuser.

20 Claims, 7 Drawing Sheets

(52) U.S. Cl.
CPC .... *F05D 2240/128* (2013.01); *F05D 2240/35* (2013.01); *F05D 2250/232* (2013.01)

(56) References Cited

U.S. PATENT DOCUMENTS

| | | |
|---|---|---|
| 5,951,246 A | 9/1999 | Uematsu et al. |
| 7,731,475 B2 | 6/2010 | Hardin |
| 2009/0068006 A1* | 3/2009 | Hardin ............... F01D 25/30 415/211.2 |
| 2009/0263241 A1* | 10/2009 | Demiraydin ........... F01D 25/30 415/207 |
| 2014/0271168 A1* | 9/2014 | Lopez-Parra .......... F01D 25/30 415/207 |
| 2014/0348647 A1 | 11/2014 | Stang et al. |

* cited by examiner

ASYMMETRIC GAS TURBINE EXHAUST DIFFUSER

CROSS-REFERENCE TO RELATED APPLICATIONS

This application claims priority to and benefit of European Patent Application No. EP17461507.0, entitled "ASYMMETRIC GAS TURBINE EXHAUST DIFFUSER", filed Jan. 30, 2017, which is herein incorporated by reference in its entirety.

BACKGROUND

The subject matter disclosed herein relates to exhaust diffusers for a gas turbine engine.

Gas turbine systems generally include a gas turbine engine having a compressor section, a combustor section, and a turbine section. The turbine section generally receives hot combustion gases and outputs exhaust and usable rotational energy. An exhaust diffuser is usually coupled to the turbine to receive exhaust from the turbine. The exhaust diffuser is also coupled to an exhaust collector where at least some of the exhaust from the diffuser is output. There may be an unnecessary loss of pressure in gas turbine exhaust systems when the diffuser is located within the exhaust collector and the exit of the collector is located in a direction diverging from the gas turbine's center axis. This loss of pressure may be attributed at least partially to a rapid change of flow direction.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine exhaust diffuser having a longitudinal axis and a longitudinal length, wherein the gas turbine exhaust diffuser is configured to be at least partially disposed within an exhaust collector. The gas turbine exhaust diffuser includes an inner wall configured to extend to a back wall of the exhaust collector, an outer wall circumferentially disposed about the inner wall along a portion of the longitudinal length, and an inlet located between a first upstream end of the inner wall and a second upstream end of the outer wall. The inlet is configured to receive an exhaust flow from a gas turbine engine. An outlet is located between the inner wall and a downstream end of the outer wall, wherein the outlet is configured to discharge the exhaust into the exhaust collector. The outer wall is asymmetrically shaped so that an opening between the outlet and the back wall of the exhaust collector is larger on a first lateral side of the gas turbine exhaust diffuser adjacent an exhaust exit of the exhaust collector than a second lateral side of the gas turbine exhaust diffuser opposite the first lateral side.

In a second embodiment, a system includes an exhaust collector including a front wall, a back wall disposed opposite the front wall, and an exhaust exit. The system also includes a gas turbine engine, having a compressor, a combustion section, a turbine, and a gas turbine exhaust diffuser. The gas turbine exhaust diffuser has a longitudinal axis, a longitudinal length, and extends into the exhaust collector from the front wall to the back wall. The gas turbine exhaust diffuser includes an inner wall configured to extend to the back wall of the exhaust collector and an outer wall circumferentially disposed about the inner wall along a portion of the longitudinal length. The inner wall includes a first lateral side adjacent the exhaust exit of the exhaust collector and a second lateral side disposed opposite the first lateral side and an inlet located between a first upstream end of the inner wall and a second upstream end of the outer wall. The inlet is configured to receive an exhaust flow from the gas turbine engine. An outlet is located between the inner wall and a downstream end of the outer wall and is configured to discharge the exhaust into the exhaust collector. A first line extends from the downstream end of the outer wall at the second lateral side to the downstream end of the outer wall at the first lateral side and is angled at an angle relative to a second line that is orthogonal to the longitudinal axis.

In a third embodiment, a system includes a gas turbine exhaust diffuser having a longitudinal axis and a longitudinal length and is configured to be at least partially disposed within an exhaust collector. The gas turbine exhaust diffuser further includes an inner conical wall configured to extend to a back wall of the exhaust collector wherein the back wall is orthogonal to the longitudinal axis, an outer conical wall circumferentially disposed about the inner wall along a portion of the longitudinal length, and an inlet located between a first upstream end of the inner conical wall and a second upstream end of the outer conical wall. The inlet is configured to receive an exhaust flow from a gas turbine engine. An outlet is located between the inner conical wall and a downstream end of the outer conical wall and is configured to discharge the exhaust into the exhaust collector. The outer conical wall is asymmetrically shaped so that an opening between the outlet and the back wall of the exhaust collector is larger on a first lateral side of the gas turbine exhaust diffuser adjacent an exhaust exit of the exhaust collector than a second lateral side of the gas turbine exhaust diffuser opposite the first lateral side. A line extends from the downstream end of the outer conical wall at the second lateral side to the downstream end of the outer conical wall at the first lateral side and is angled at an angle relative to the longitudinal axis. The angle is the smallest angle formed between the line and the longitudinal axis, and the angle is between 70 and 85 degrees.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to an asymmetric gas turbine exhaust diffuser. Generally, gas turbine exhaust diffusers convert dynamic pressure of exhaust gases of the turbine engine into static pressure. For conventional axial or radial diffusers, this is accomplished through increasing a flow cross-sectional area along the diffuser flow path. For gas turbine exhaust diffusers disposed partially within an exhaust collector, there may be an undesired pressure loss at least partially due to both a rapid change of flow direction when the exhaust collector exit diverges from the gas turbine's longitudinal center axis and a rapid increase of the cross-section along the flow-path. This pressure loss may lead to a reduction of the performance of the exhaust system. Conventional gas turbine exhaust systems may utilize turning vanes to help reduce this pressure loss. The asymmetric gas turbine exhaust diffuser reduces pressure losses in the exhaust system by allowing exhaust gases to expand freely in the vicinity of a larger, clear opening. (e.g., without the use of turning vanes). To do this, the diffuser is asymmetrically shaped in that a first lateral side, located in the vicinity of the exhaust diffuser outlet, has a larger opening than a second lateral side, which is located on the opposite side of the first lateral side of the diffuser. The function of diffuser may further benefit through the use of an outer lip of the diffuser helping to direct the exhaust gases as desired (e.g., similar to the function of airfoils). The asymmetric gas turbine exhaust diffuser allows for easier transportation of the diffuser due to the lighter structure, cheaper construction due to less raw materials, and better overall performance of the exhaust system relative to conventional gas turbine exhaust systems.

Figure 1:
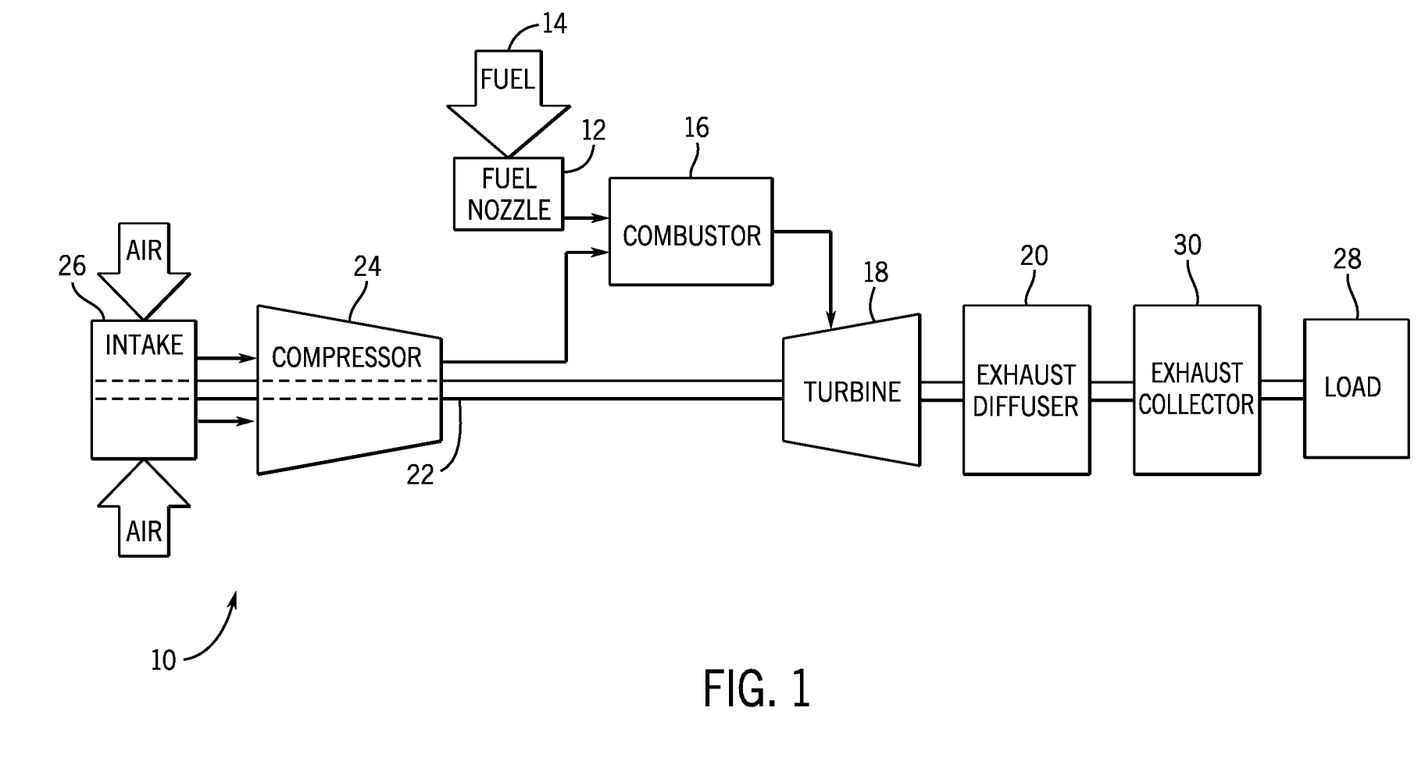
FIG. 1 is a block diagram of an embodiment of a turbine system with a gas turbine exhaust diffuser that may be asymmetric, and an exhaust collector.

Turning now to the figures, FIG. 1 is a block diagram of an embodiment of a turbine system 10 (e.g., gas turbine engine) that utilizes an asymmetric exhaust diffuser. The turbine system 10 may use liquid or gas fuel, such as natural gas and/or a hydrogen rich synthetic gas, to drive the turbine system 10. As depicted, the fuel nozzles 12 intake a fuel supply 14, mix the fuel with air, and distribute the fuel-air mixture into a combustor 16 in a suitable ratio for optimal combustion, emissions, fuel consumption, and power output. The turbine system 10 may include fuel nozzles 12 located inside one or more combustors 16. The fuel-air mixture combusts in a chamber within the combustor 16, thereby creating hot pressurized exhaust gases. The combustor 16 directs the exhaust gases through a turbine 18 toward a gas turbine exhaust diffuser 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. An exhaust collector 30 may be used to capture and redirect exhaust exiting the gas turbine engine. The diffuser 20 may be partially disposed within the exhaust collector 30. As described in greater detail below, outer walls of the gas turbine exhaust diffuser 20 may be asymmetric in that an opening of a passageway of the diffuser 20 may be larger on one side relative to a longitudinal axis of the diffuser 20 than another side.

Figure 2:
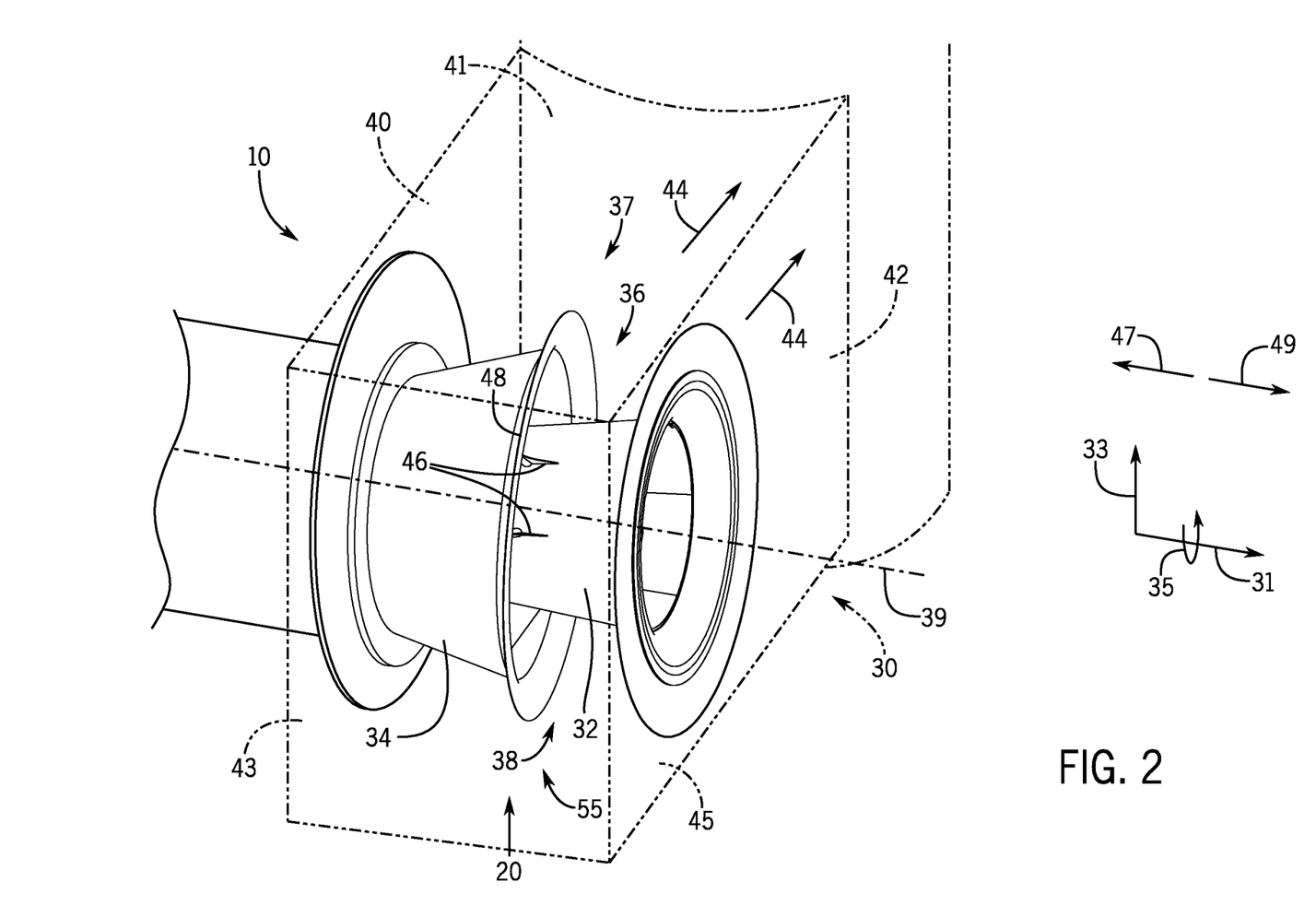
FIG. 2 is a perspective view illustrating an embodiment of a portion of a turbine system including a gas turbine exhaust diffuser disposed partially in an exhaust collector.

FIG. 2 is a perspective view illustrating an embodiment of a portion of a turbine system 10 including a gas turbine exhaust diffuser 20 disposed partially in an exhaust collector 30. It should be noted that any exhaust collector discussed herein (e.g., exhaust collector 30) may be a horizontal outlet exhaust diffuser in some embodiments, and may be a vertical outlet exhaust collector in other embodiments. The diffuser 20 may include a longitudinal axis 39 that is in line with a longitudinal axis of the gas turbine system. Throughout the discussion presented herein, a set of axes will be referenced. These axes are defined relative to the longitudinal axis 39 and point in an axial direction 31, a radial direction 33, and a circumferential direction 35. The turbine exhaust diffuser 20 may include an inner shell 32, an outer shell 34, a first opening 36, and a second opening 38. The first opening 36 may be larger and located closer to the location of the exhaust collector exit 52 of the exhaust collector 30 than the second opening 38. The collector 30 may include a front wall 40, and a back wall 42 disposed opposite and parallel to the front wall 40 with the front wall 40 disposed upstream 47 of the back wall 42. Both walls 40, 42 may be orthogonal to the longitudinal axis 39. The collector 30 may also be divided into two lateral sides relative to the longitudinal axis 39. It should be noted that lateral sides relative to the longitudinal axis 39 discussed herein may be with respect to a vertical direction (e.g., above and below the longitudinal axis 39 from a side perspective) in embodiments having a vertical outlet exhaust collector. In other embodiments having a horizontal outlet exhaust collector, lateral sides relative to the longitudinal axis 39 discussed herein may be with respect to a horizontal direction (e.g., to the left and to the right of the longitudinal axis 39 from a top perspective). The gas turbine exhaust diffuser 20 may be asymmetric in that the first opening 36, substantially in a first lateral side 37 of the diffuser 20, may be larger than the second opening 38, substantially in a second lateral side 55 of the diffuser 20. Therefore, exhaust of the turbine 18 may substantially flow towards the first lateral side 37 of the diffuser 20 with the larger first opening 36 as indicated by exhaust flow 44. The first opening 36 may be defined as on the first lateral side 37 and between the upstream 47 side of the back wall 42 and the downstream 49 end of an outer shell 34. The second opening 38 may be defined as on the second lateral side 55 and between the upstream 47 side of the back wall 42 and the downstream 49 end of the outer shell 34. In some embodiments, there may be struts 46 between the inner shell 32 and the outer shell 34. The cross-sectional shape of the struts 46 may be, for example (but are not limited to), rectilinear, circular, oval, or airfoil shaped. The asymmetry described above of the diffuser 20 facilitates converting dynamic pressure of the exhaust gases of the turbine engine 10 into static pressure. It also helps to reduce pressure loss by allowing the exhaust gases to expand freely in the vicinity of the larger opening 36 of the diffuser 20. Further, the collector 30 may have a first wall 41, a second wall 43, and a third wall 45 connecting the front wall 40 and the back wall 42. The first wall 41 may be orthogonal to the front, back, and second walls 40, 42, 43, and parallel to the third wall 45. The second wall 43 may be located opposite to the exhaust collector exit 52 and is orthogonal to the front, back, first, and third walls 40, 42, 41, 45. In some embodiments, the second wall 43 may be linear and flat. In other embodiments, the second wall 43 may be curved in shape. The third wall 45 may be parallel to the first wall 41 and orthogonal to the front, back, and second walls 40, 42, 43.

Figure 3:
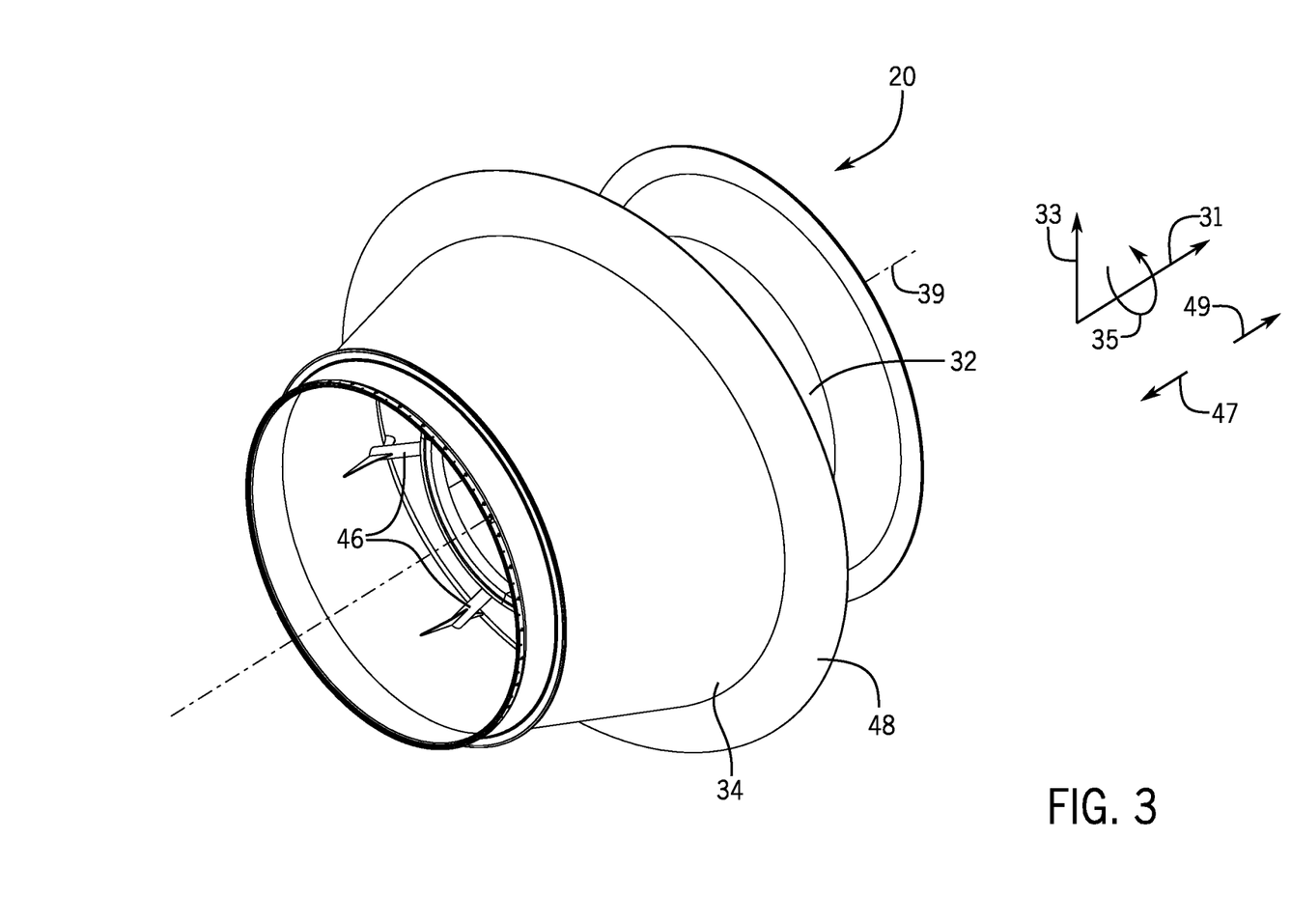
FIG. 3 is a perspective view illustrating an embodiment of an asymmetric gas turbine exhaust diffuser.

FIG. 3 is a perspective view illustrating an embodiment of the gas turbine exhaust diffuser 30. The outer shell 34 may simultaneously extend in the axial direction 31 and radial direction 33 relative to the longitudinal axis 39 of the diffuser 20. In some embodiments, there may be an outer lip 48 disposed on a downstream 49 end of the outer shell 34. In some embodiments, the outer lip 48 may be curved, extending in the axial 31 and radial direction 33 relative to the longitudinal axis 39. In some embodiments, the outer lip 48 may be linear, extending in the axial 31 and radial direction 33 relative to the longitudinal axis 39. In further embodiments, the outer lip 48 may take on a tubular shape, extending in the circumferential direction 35 relative to the longitudinal axis 39.

Figure 4:
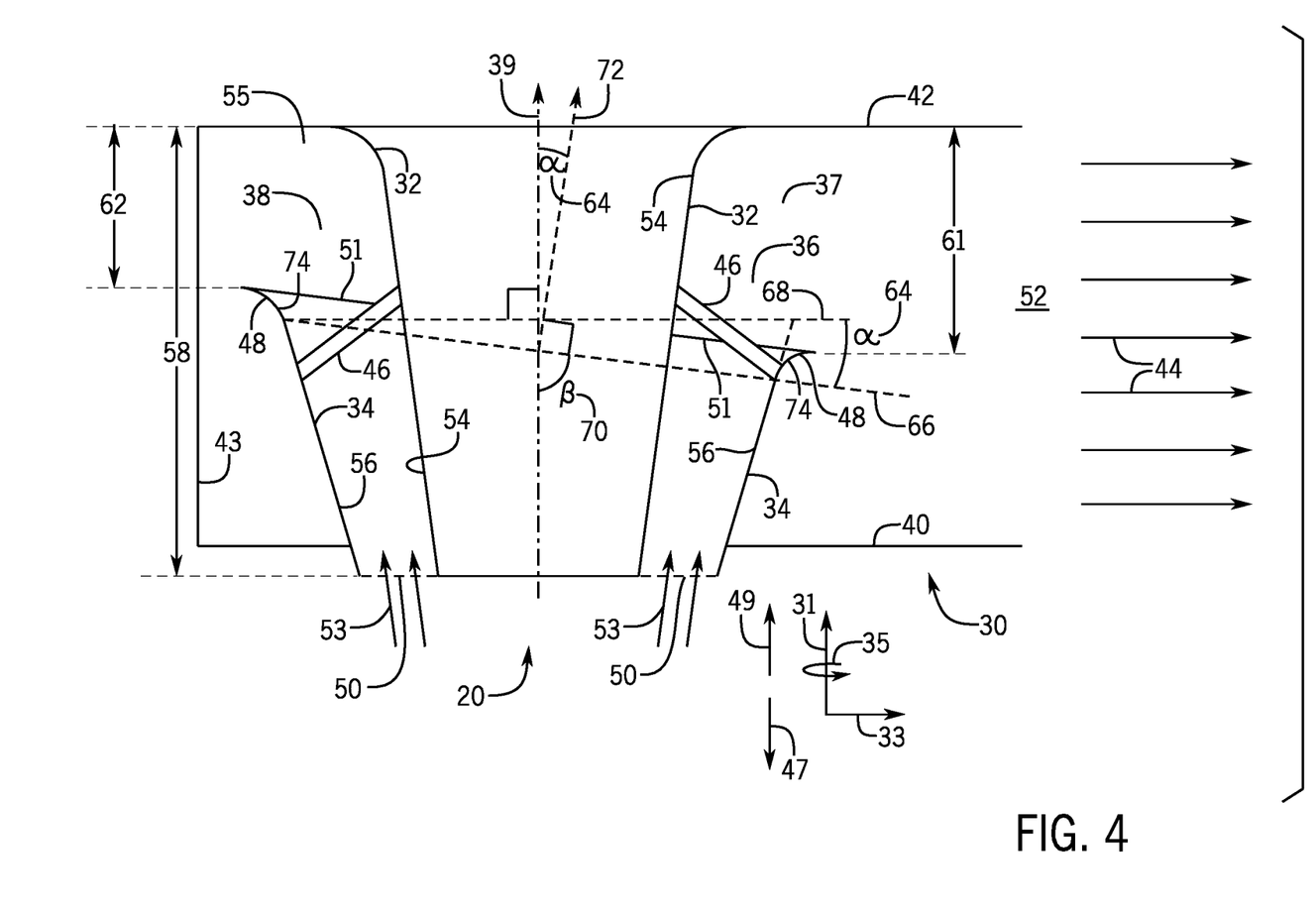
FIG. 4 is a cross-sectional view illustrating an embodiment of an asymmetric gas turbine exhaust diffuser and exhaust collector (e.g., an embodiment of the diffuser having a curved outer lip)

FIG. 4 is a cross-sectional view illustrating an embodiment of an asymmetric gas turbine exhaust diffuser 20 partially disposed in an exhaust collector 30. In embodiments having a vertical outlet exhaust collector, FIG. 4 may be a side view. In other embodiments having a horizontal exhaust collector, FIG. 4 may be a top view. The diffuser 20 extends into the collector 30 in the axial direction 31 relative to the longitudinal axis 39 from the front wall 40 of the collector 30 toward the downstream 49 end of the collector 30. The diffuser 20 includes an inner shell 32 and an outer shell 34 that may define an inner wall 54 and an outer wall 56, respectively. Hereinafter, when the shape, function, direction, etc. of the inner wall 54 and outer wall 56 is described, the inner shell 32 and the outer shell 34, respectively, may have the same shape, function, direction, etc. and vice versa. The exhaust collector 30 extends a longitudinal length 58 relative to the axial direction 31. The inner shell 32 extends may extend a portion of or all of the longitudinal length 58 from the front wall 40 to the back wall 42. The outer shell 34 extends a portion of longitudinal length 58 in the circumferential direction 35 about the inner shell 32. In some embodiments the outer wall 56 may be linear, extending in the axial 31 and radial 33 direction relative to the longitudinal axis 39. In other embodiments, the outer wall 56 may extend in a curved direction inward toward the longitudinal axis 39 or away from the longitudinal axis 39 from the upstream 47 end to the downstream 49 end. The inner wall 54 and the outer wall 56 may both be conical in shape extending circumferentially 35 in the axial direction 31 with respect to the longitudinal axis 39 with the outer wall 56 circumferentially disposed about the inner wall 54 along a portion of the longitudinal length 58. Exhaust may flow, as indicated by arrows 53, in through an inlet 50. Exhaust may then flow out through an outlet 51, into the exhaust collector 30. Exhaust may then flow out of the exhaust collector exit 52, as indicated by exhaust flow 44. The inlet 50 may be generally located between the upstream 47 end of the outer wall 56 and the upstream 47 end of the inner wall 54. The outlet 51 may be generally located between the inner wall 54 and a downstream 49 end of the outer wall 56.

The gas turbine exhaust diffuser 20 includes a first lateral side 37 and a second lateral side 55 relative to the longitudinal axis 39 from a perspective as is generally seen in FIG. 4. The outer wall 56 is asymmetrically shaped so that an opening between the outlet 51 and the back wall 42 is larger in the first opening 36 than in the second opening 38. The distances between the openings 36, 38 and the back wall 42 can be seen in the first opening length 61 and the second opening length 62, respectively. In certain embodiments, the first opening length 61 may be approximately 30% larger than the second opening length 62. In other embodiments, the first opening length 61 may be between approximately 25% and 60% greater, more than approximately 50% greater, approximately 20% greater, or approximately 40% greater than the second opening length 62. The asymmetry of the diffuser 20 can also be expressed through an angle 64. However, the asymmetry can also be defined by other angles too, depending on the reference point. For example, the angle 64 can be seen between a first line 66 and a second line 68. The first line 66 extends from the downstream 49 end of the outer wall 56 on the second lateral side 55 to the downstream 49 end of the outer wall 56 on the first lateral side 37. The second line 68 is perpendicular to the longitudinal axis 39 of the diffuser 20 and may intersect the first line 66 on the downstream 49 end of the outer wall 56 on the second lateral side 55. It should be noted that a complimentary angle 70 to the angle 64 may be formed. The complimentary angle 70 may be the smallest angle between the first line 66 and the longitudinal axis 39. The angle 64 may also be seen between the longitudinal axis 39 and a third line 72. The third line 72 may be a normal line relative to the first line 66 and intersect the first line 66 at the longitudinal axis 39 to form the angle 64. The angle 64 may be greater than 0 degrees, greater than 5 degrees, or between 5 and 20 degrees. Consequently, the complimentary angle 70 may be greater than 0 degrees and less than 90 degrees, less than 85 degrees, or between 70 and 85 degrees. In some embodiments, the diffuser 20, may not include struts 46. In certain embodiments, the diffuser 20 may contain at least one strut 46, between 2 and 8 struts 46, less than 10 struts, less than 20 struts 46, or between 4 and 16 struts 46. The cross-section of the strut(s) 46 may be for example, but is not limited to, rectilinear, circular, oval, or airfoil.

In the embodiment depicted in FIG. 4, the outer lip 48 is in the form of a curved wall 74 extending in both the axial direction 31 and the radial direction 33 relative to the longitudinal axis 39.

Figure 5:
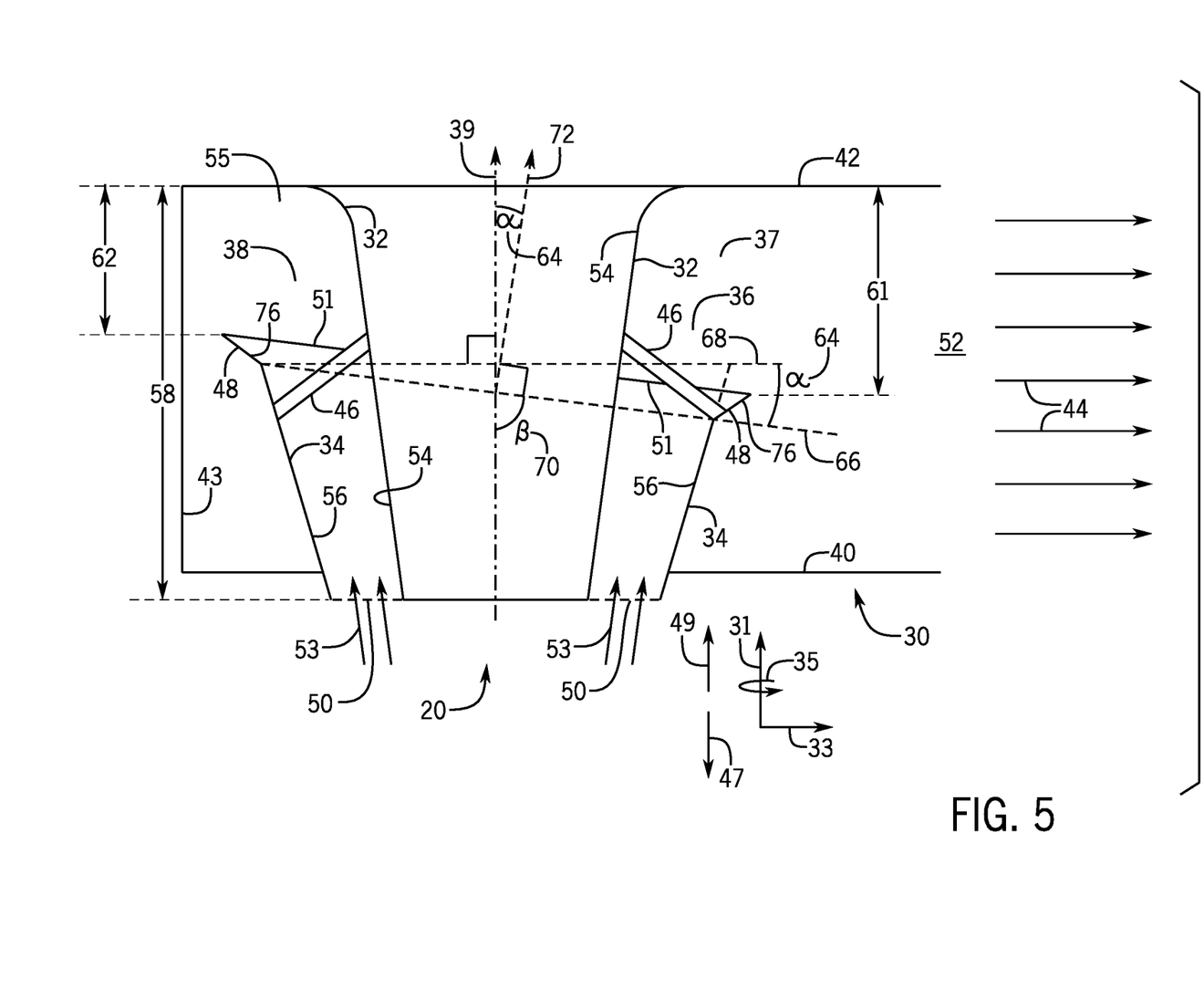
FIG. 5 is a cross-sectional view illustrating an embodiment of an asymmetric gas turbine exhaust diffuser and exhaust collector (e.g., an embodiment of the diffuser having a linear outer lip)

The embodiment depicted in FIG. 5 may be as described above in regard to FIG. 4 except that the outer lip 48 is in the form of a linear wall 76 extending linearly in both the axial direction 31 and the radial direction 33 relative to the longitudinal axis 39.

Figure 6:
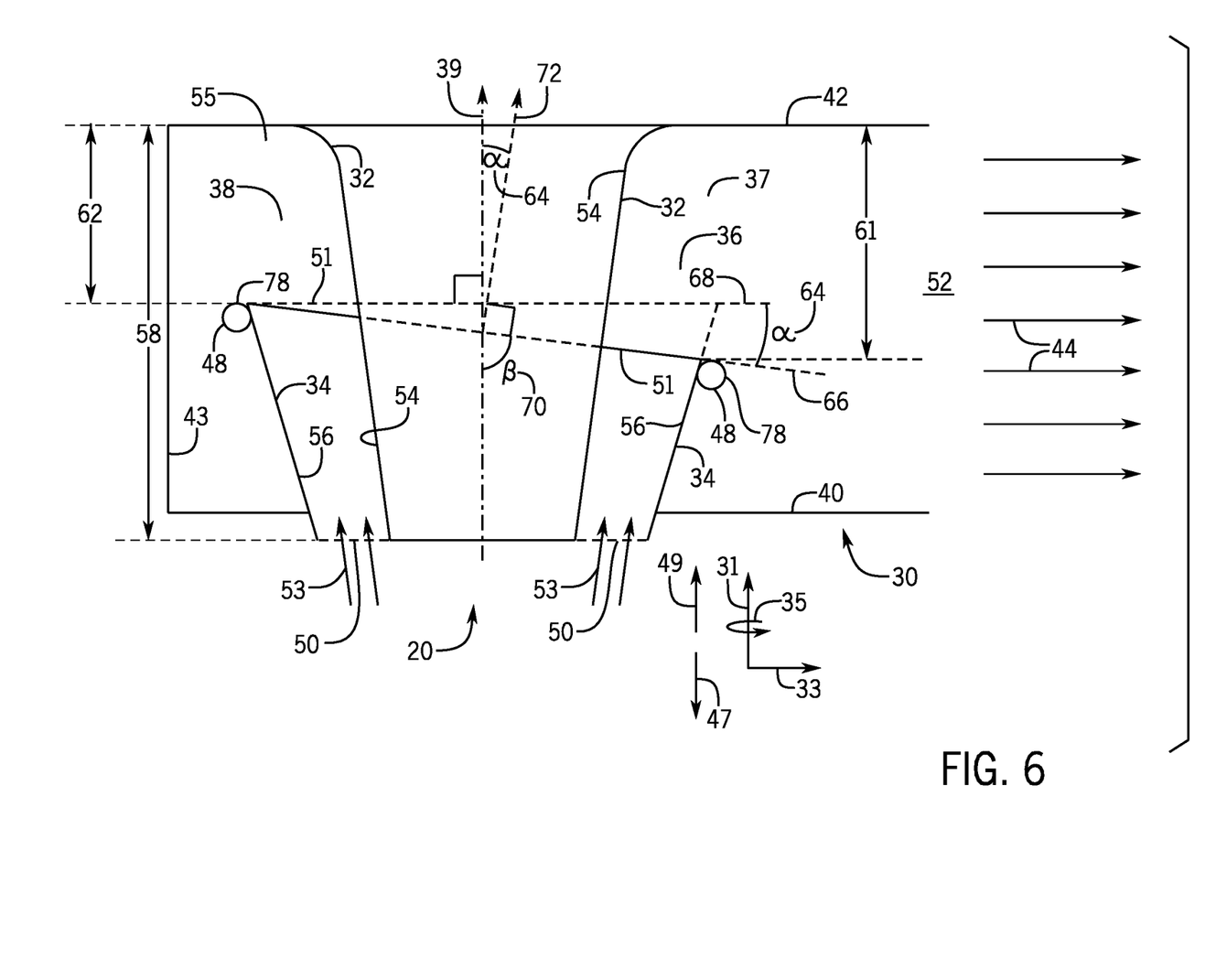
FIG. 6 is a cross-sectional view illustrating an embodiment of an asymmetric gas turbine exhaust diffuser and exhaust collector (e.g., an embodiment of the diffuser having a tubular outer lip)

The embodiment depicted in FIG. 6 may be as described above in regard to FIG. 4 except that the outer lip 48 is in the form of a tubular structure 78 extending circumferentially 35 on the downstream 49 end of the outer lip 48. The embodiment depicted in FIG. 6 is an example of an embodiment where strut(s) 46 are not present. However, in other embodiments there may more one or more strut(s) 46 as described in greater detail above.

Figure 7:
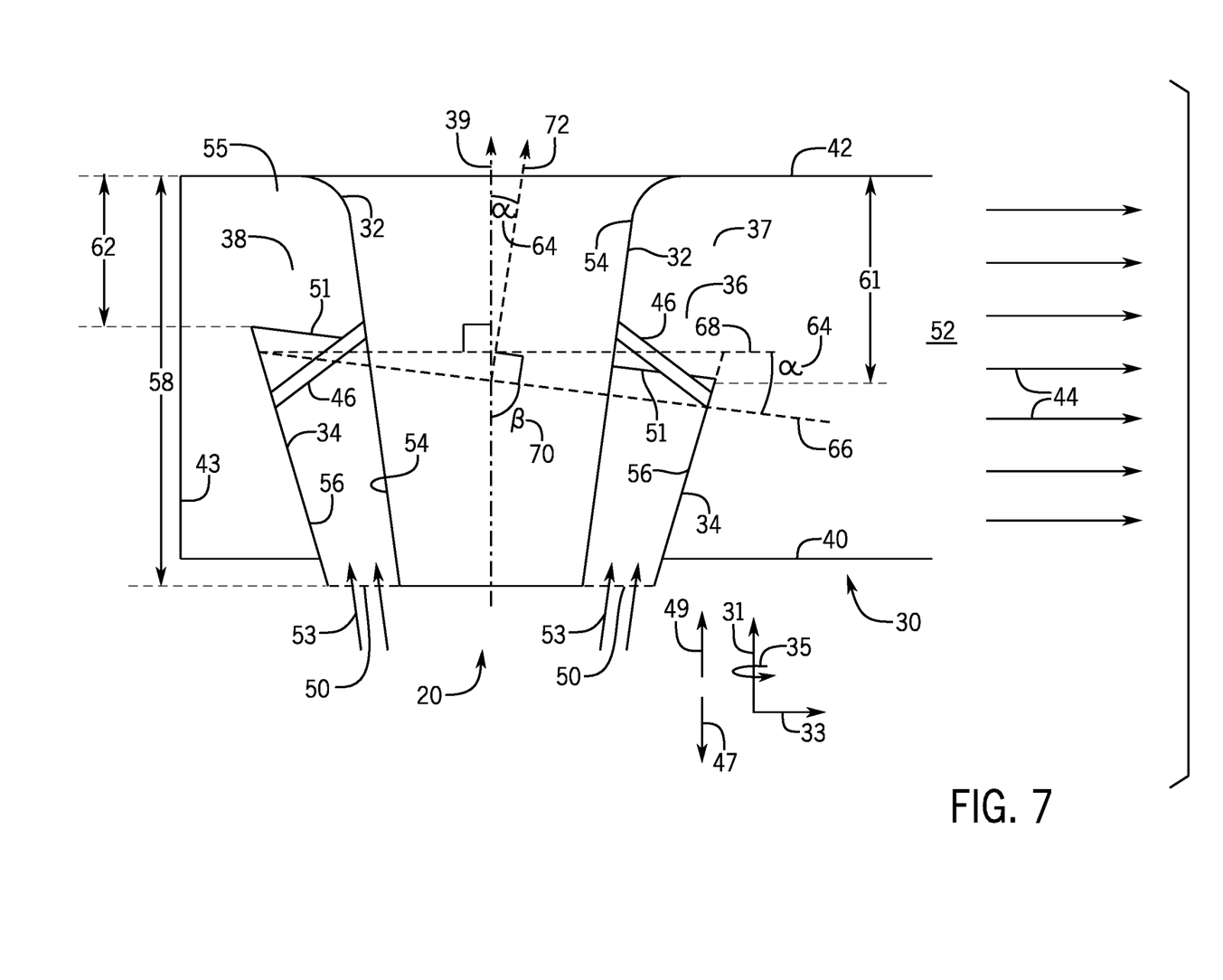
FIG. 7 is a cross-sectional view illustrating an embodiment of an asymmetric gas turbine exhaust diffuser and exhaust collector (e.g., an embodiment of the diffuser without an outer lip).

The embodiment depicted in FIG. 7 may be as described above in regard to FIG. 4 except that in this embodiment, there is no outer lip 48 disposed on a downstream 49 end of the outer wall 56.

Technical effects of the invention include providing an asymmetric gas turbine exhaust diffuser in which the outlet of the diffuser on the side of the exhaust collector's outlet is larger than on the opposite side of the diffuser. The asymmetric gas turbine exhaust diffuser will provide for better overall performance (e.g., improved pressure recovery factor, less total pressure loss, etc.) of the exhaust system of the gas turbine engine relative to conventional turbine exhaust systems. Furthermore, the asymmetric gas turbine exhaust diffuser will result in less back pressure, enable a reduction of the exhaust collector size without a reduction in performance, and does not have a need for turning vanes. These aspects result in a cheaper and lighter structure of the exhaust diffuser, resulting in less manufacturing costs and easier transportation of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine exhaust diffuser having a longitudinal axis and a longitudinal length, wherein the gas turbine exhaust diffuser is configured to be at least partially disposed within an exhaust collector, and the gas turbine exhaust diffuser comprises:
an inner wall configured to extend to a back wall of the exhaust collector;
an outer wall circumferentially disposed about the longitudinal axis and the inner wall along a portion of the longitudinal length;
an inlet located between a first upstream end of the inner wall and a second upstream end of the outer wall, wherein the inlet is configured to receive an exhaust flow from a gas turbine engine;
an outlet located between the inner wall and a first downstream end of the outer wall, wherein the outlet is configured to discharge the exhaust flow into the exhaust collector; and
an outer lip coupled to the first downstream end of the outer wall, wherein the outer lip comprises a linear wall or a curved wall extending in both an axial direction and a radial direction relative to the longitudinal axis;
wherein the outer wall is asymmetrically shaped relative to the longitudinal axis so that an opening between the outlet and the back wall of the exhaust collector is larger on a first lateral side of the gas turbine exhaust diffuser adjacent an exhaust exit of the exhaust collector than a second lateral side of the gas turbine exhaust diffuser opposite the first lateral side.

2. The system of claim 1, wherein the inner wall comprises a conical inner wall and the outer wall comprises a conical outer wall.

3. The system of claim 1, wherein a first line extending from the first downstream end of the outer wall at the second lateral side to the first downstream end of the outer wall at the first lateral side is angled at an angle relative to the longitudinal axis, wherein the angle is greater than 0 degrees and less than 90 degrees.

4. The system of claim 3, wherein the angle is at least 70 degrees.

5. The system of claim 3, wherein the angle is less than 85 degrees.

6. The system of claim 3, wherein the angle is between 70 and 85 degrees.

7. The system of claim 1, wherein the outer wall is linear in a direction along the longitudinal axis from the second upstream end until the first downstream end.

8. The system of claim 1, wherein the outer wall is curved in a direction along the longitudinal axis from the second upstream end until the first downstream end.

9. The system of claim 2, comprising an opening disposed axially between the first downstream end of the outer wall and a second downstream end of the inner wall, wherein the conical outer wall surrounds a first portion of the conical inner wall, and the opening surrounds a second portion of the conical inner wall.

10. The system of claim 9, wherein an angle of the conical inner wall is constant in the first and second portions of the conical inner wall.

11. The system of claim 1, wherein the outer lip comprises the linear wall extending in both the axial direction and the radial direction relative to the longitudinal axis.

12. The system of claim 1, wherein the outer lip comprises the curved wall extending in both the axial direction and the radial direction relative to the longitudinal axis.

13. The system of claim 1, wherein the gas turbine exhaust diffuser comprises at least one strut extending between the inner wall and the outer wall.

14. The system of claim 1, comprising a gas turbine engine having the gas turbine exhaust diffuser.

15. A system, comprising:
an exhaust collector comprising a front wall, a back wall disposed opposite the front wall, and an exhaust exit;
a gas turbine engine, comprising a compressor, a combustion section, a turbine, and a gas turbine exhaust diffuser, wherein the gas turbine exhaust diffuser has a longitudinal axis and a longitudinal length, the gas turbine exhaust diffuser extends into the exhaust collector from the front wall to the back wall, and the gas turbine exhaust diffuser comprises:

an inner wall configured to extend to the back wall of the exhaust collector;

an outer wall circumferentially disposed about the longitudinal axis and the inner wall along a portion of the longitudinal length, wherein the outer wall comprises a first lateral side adjacent the exhaust exit of the exhaust collector and a second lateral side disposed opposite the first lateral side;

an inlet located between a first upstream end of the inner wall and a second upstream end of the outer wall, wherein the inlet is configured to receive an exhaust flow from the gas turbine engine;

an outlet located between the inner wall and a downstream end of the outer wall, wherein the outlet is configured to discharge the exhaust flow into the exhaust collector; and an outer lip coupled to the downstream end of the outer wall, wherein the outer lip comprises a linear wall or a curved wall extending in both an axial direction and a radial direction relative to the longitudinal axis;

wherein a first line extending from the downstream end of the outer wall at the second lateral side to the downstream end of the outer wall at the first lateral side is angled at an angle relative to a second line that is orthogonal to the longitudinal axis.

16. The system of claim 15, wherein the outer wall is asymmetrically shaped so that an opening between the outlet and the back wall of the exhaust collector is larger on the first lateral side than the second lateral side of the gas turbine exhaust diffuser.

17. The system of claim 15, wherein the angle is between 5 and 20 degrees.

18. The system of claim 15, wherein the back wall is parallel with the second line.

19. A system, comprising:

a gas turbine exhaust diffuser having a longitudinal axis and a longitudinal length, wherein the gas turbine exhaust diffuser is configured to be at least partially disposed within an exhaust collector, and the gas turbine exhaust diffuser comprises:

an inner conical wall configured to extend to a back wall of the exhaust collector, wherein the back wall is orthogonal to the longitudinal axis;

an outer conical wall circumferentially disposed about the longitudinal axis and about a first portion of the inner conical wall along a portion of the longitudinal length;

an inlet located between a first upstream end of the inner conical wall and a second upstream end of the outer conical wall, wherein the inlet is configured to receive an exhaust flow from a gas turbine engine;

an outlet located radially between the inner conical wall and a first downstream end of the outer conical wall, wherein the outlet is configured to discharge the exhaust flow into the exhaust collector; and an opening disposed axially between the first downstream end of the outer conical wall and a second downstream end of the inner conical wall, wherein the opening is circumferentially disposed about a second portion of the conical inner wall;

wherein the outer conical wall is asymmetrically shaped relative to the longitudinal axis so that the opening is larger on a first lateral side of the gas turbine exhaust diffuser adjacent an exhaust exit of the exhaust collector than a second lateral side of the gas turbine exhaust diffuser opposite the first lateral side, and wherein a line extending from the first downstream end of the outer conical wall at the second lateral side to the first downstream end of the outer conical wall at the first lateral side is angled at an angle relative to the longitudinal axis, wherein the angle is between 70 and 85 degrees.

20. The system of claim 19, comprising an outer lip coupled to the first downstream end of the outer conical wall, wherein the outer lip comprises a linear wall or a curved wall extending in both an axial direction and a radial direction relative to the longitudinal axis.

* * * * *